(12) United States Patent
Ahmad et al.

(10) Patent No.: US 12,101,755 B2
(45) Date of Patent: Sep. 24, 2024

(54) MULTIPLE RADIO OPPORTUNISTIC SCHEDULING

(71) Applicant: FORD GLOBAL TECHNOLOGIES, LLC, Dearborn, MI (US)

(72) Inventors: Syed Amaar Ahmad, Canton, MI (US); Ivan Vukovic, Birmingham, MI (US); Jayanthi Rao, West Bloomfield, MI (US); Azin Neishaboori, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 368 days.

(21) Appl. No.: 17/711,526

(22) Filed: Apr. 1, 2022

(65) Prior Publication Data

US 2023/0319812 A1    Oct. 5, 2023

(51) Int. Cl.
*H04W 72/12*    (2023.01)
*H04W 72/1268*    (2023.01)

(52) U.S. Cl.
CPC ... *H04W 72/1215* (2013.01); *H04W 72/1268* (2013.01)

(58) Field of Classification Search
CPC ............. H04W 72/1215; H04W 72/1268
See application file for complete search history.

(56) References Cited

U.S. PATENT DOCUMENTS

| 10,383,147 B2 | 8/2019 | Rajagopal et al. | |
| 10,833,814 B2 | 11/2020 | Hwang et al. | |
| 2013/0171955 A1* | 7/2013 | Makhlouf | H04W 52/242 455/423 |
| 2019/0349957 A1 | 11/2019 | Sorrentino et al. | |
| 2020/0314940 A1 | 10/2020 | Park et al. | |
| 2022/0085899 A1* | 3/2022 | Vukovic | H04L 43/0894 |

FOREIGN PATENT DOCUMENTS

WO    2020025111 A1    2/2020

OTHER PUBLICATIONS

Kim, Coexistence of Wireless Systems for Spectrum Sharing, Dissertation Submitted to the Faculty of the Virginia Polytechnic Institute and State University, Jun. 7, 2017.

* cited by examiner

*Primary Examiner* — Brenda H Pham
(74) *Attorney, Agent, or Firm* — Joseph Zane; Brooks Kushman P.C.

(57) ABSTRACT

Scheduling communications using a plurality of wireless interfaces is provided. Signals are monitored that are received from a first antenna configured to send and/or receive first messages over a first message protocol. Using the signals, time slot information is updated that is indicative of which equally-sized consecutive future time slots the first antenna is predicted to transmit and/or receive the first messages. A transmission is scheduled of a second message over a second antenna configured to send and/or receive second messages over a second message protocol using the time slot information to avoid out-of-band emission (OOBE) interference.

26 Claims, 7 Drawing Sheets

MULTIPLE RADIO OPPORTUNISTIC SCHEDULING

TECHNICAL FIELD

Aspects of the disclosure generally relate to opportunistic scheduling for use in multiple wireless technology environments.

BACKGROUND

Vehicles may broadcast BSMs according to the 3rd Generation Partnership Project (3GPP) release 14/15 cellular vehicle-to-everything (C-V2X) standard. This is sometimes referred to as the long-term evolution (LTE) vehicle-to-everything (V2X). These messages may be broadcast in channel 183 (at 5905-5925 MHz), and may be used for applications such as object avoidance. For additional applications, the vehicles may use 3GPP Release 16+ (5G new radio (NR)) communications, may rely on an adjacent channel (at 5855-5905 MHz). These additionally 5G NR applications may include various intelligent transportation system (ITS) use cases.

SUMMARY

In one or more illustrative examples, a system for scheduling communications using a plurality of wireless interfaces is provided. A first antenna is configured to send and/or receive first messages over a first message protocol. A second antenna is configured to send and/or receive second messages over a second message protocol. The first antenna and the second antenna operate on different channels. A controller is configured to utilize a scheduler to perform operations including to monitor signals received from the first antenna, using the signals, update time slot information indicative of which equally-sized consecutive future time slots the first antenna is predicted to transmit and/or receive the first messages, and schedule a transmission of a second message using the second antenna over the second message protocol, using the time slot information to avoid out-of-band emission (OOBE) interference.

In one or more illustrative examples, a method for scheduling communications using a plurality of wireless interfaces is provided. Signals are monitored that are received from a first antenna configured to send and/or receive first messages over a first message protocol. Using the signals, time slot information is updated that is indicative of which equally-sized consecutive future time slots the first antenna is predicted to transmit and/or receive the first messages. A transmission is scheduled of a second message over a second antenna configured to send and/or receive second messages over a second message protocol using the time slot information to avoid out-of-band emission (OOBE) interference.

In one or more illustrate examples, non-transitory computer-readable medium includes instructions for scheduling communications using a plurality of wireless interfaces that, when executed by a controller, cause the controller to perform operations including to monitor signals received from a first antenna configured to send and/or receive first messages over a first message protocol; using the signals, update time slot information indicative of which equally-sized consecutive future time slots the first antenna is predicted to transmit and/or receive the first messages, wherein the time slot information indicates which of the time slots the first antenna is predicted to transmit and/or receive the first messages over a sliding window of future transmission intervals that is a multiple of interval transit time (ITT) for the first message protocol; and schedule a transmission of a second message over a second antenna configured to send and/or receive second messages over a second message protocol using the time slot information to avoid out-of-band emission (OOBE) interference.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present approach.

BSMs and 5G NR radio technologies are both part of the 3GPP standards. However, they may not interoperate and may mutually interfere. Without proper coordination and scheduling, an on-board unit (OBU) may transmit 5G NR data when it is receiving a C-V2X message. This concurrent messaging may result in interference and message loss. In this disclosure, a multiple radio system based on C-V2X and 5G NR radios is installed in a vehicle OBU such as telematics control unit (TCU). The dual radio system may be controlled through a common scheduler. This approach ensures that transmissions by the 5G NR radio avoid interference or disruption from the C-V2X communications.

Figure 1:
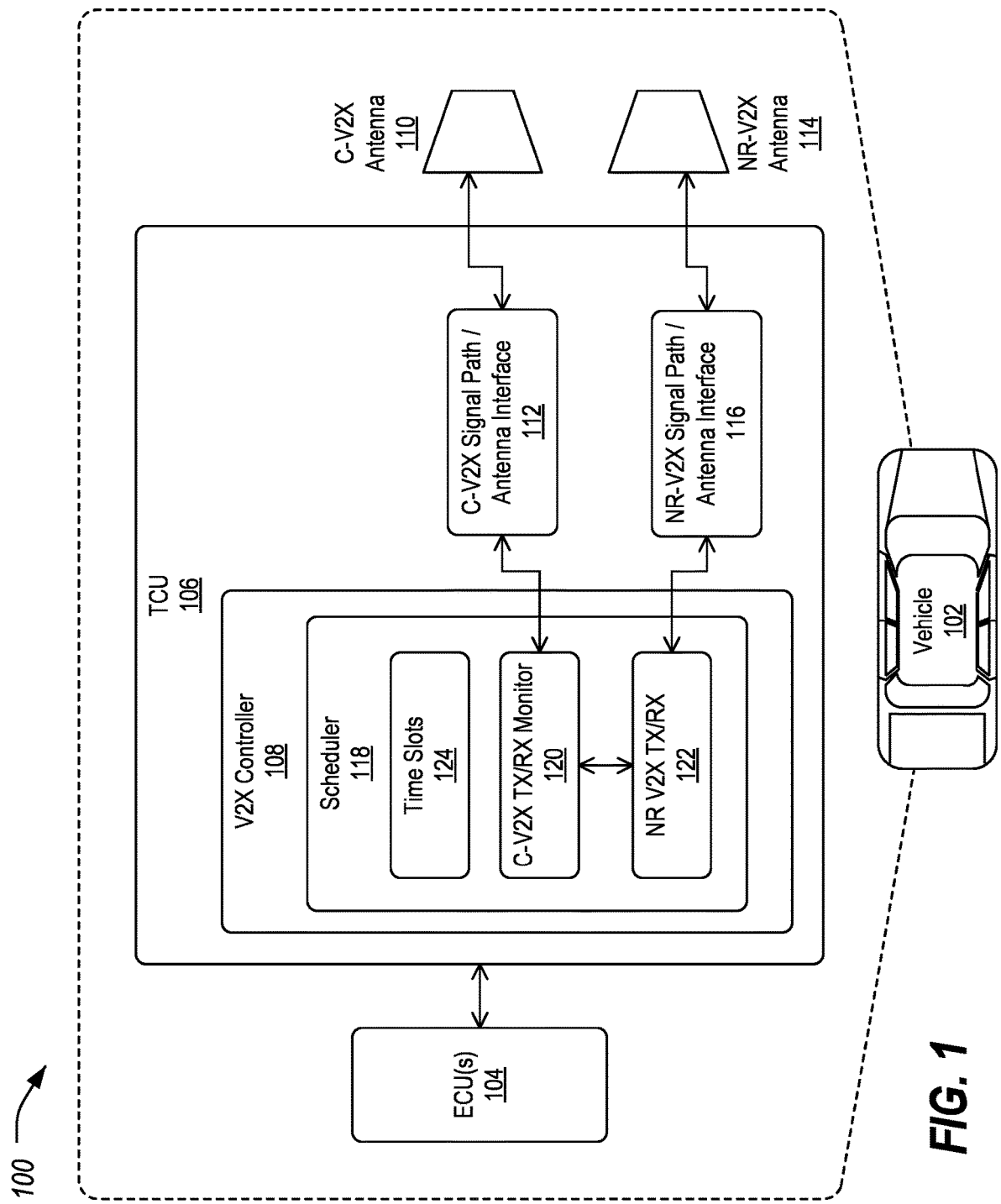
FIG. 1 illustrates an example system for scheduling vehicle communications using a plurality of wireless interfaces.

FIG. 1 illustrates an example system 100 for scheduling vehicle communications using a plurality of wireless interfaces. A TCU 106 may be connected to one or more electronic control units (ECUs) 104, e.g., over one or more vehicle buses. The TCU 106 may include a V2X module 108 that hosts a common scheduler 118 for both 5G NR and C-V2X communications. The scheduler 118 may utilize a C-V2X TX/RX monitor 120 to monitor a C-V2X antenna 110, and may utilize a NR-V2X TX/RX monitor 122 to monitor a NR-V2X antenna 114. Based on the monitoring, the scheduler 118 may be configured to schedule vehicle 102 communications to avoid interference between the wireless interfaces. While an example system 100 is shown in FIG. 1, the example components as illustrated are not intended to be limiting. For instance, some systems 100 may utilize a combined antenna for both 5G NR and C-V2X communications.

The vehicle 102 may include various types of automobile, crossover utility vehicle (CUV), sport utility vehicle (SUV), truck, recreational vehicle (RV), boat, plane, or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors. In another example, the vehicle 102 may be a pure electric vehicle driven by electric motors only.

The plurality of ECUs 104 may be configured to perform and manage various vehicle 102 functions under the power of the vehicle battery and/or drivetrain. As some non-limiting vehicle ECUs 104 examples: a powertrain control module (PCM) may be configured to control engine and transmission components; an antilock brake system (ABS) controller configured to control brake and traction control components; an electric power-assisted steering (EPAS) controller configured to control steering assistance and adjust pull or drift compensation functions; advanced driver assistance systems (ADAS) such as adaptive cruise control or automate braking; and a headlamp control module (HCM) configured to control light on/off settings. The ECUs 104 may also include other powertrain or chassis components, an infotainment system configured to support voice command and BLUETOOTH interfaces with the driver and driver carry-on devices, electromechanical body controllers such as window or lock actuators, and trailer controller components such as light control and sensor data to support connected trailers. The plurality of ECUs 104 may share physical hardware, firmware, and/or software, such that the functionality from multiple ECUs 104 may be integrated into a single ECU 104 or distributed across a plurality of ECUs 104.

The TCU 106 may be configured to support communications between the vehicle 102 and other devices. These communications may be performed over various communications protocols and for various purposes. In one example the TCU 106 may support V2X communications via the V2X module 108. As shown, the V2X module 108 is configured to provide for communications via C-V2X and NR-V2X communication interfaces. The illustrated configuration is a dual antenna configuration, having a C-V2X antenna 110 connected to the V2X module 108 via a C-V2X signal path and antenna interface 112, and a NR-V2X antenna 114 connected to the V2X module 108 via a NR-V2X signal path and antenna interface 116. It should be noted that this is only an example, and TCUs 106 configured with more, fewer, and different protocols of communications interfaces and antennas are possible.

The V2X module 108 may include the scheduler 118 as mentioned above. The scheduler 118 may be configured to schedule communications among the antenna interfaces, which in this example includes the C-V2X antenna 110 and NR-V2X antenna 114. To do so, the scheduler 118 may include a C-V2X transmit (TX)/receive (RX) monitor 120 and a NR-V2X TX/RX monitor 122. The C-V2X TX/RX monitor 120 may be configured to monitor the transmission and reception of messages via the C-V2X antenna 110. The NR-V2X TX/RX monitor 122 may be configured to monitor the transmission and reception of messages via the NR-V2X antenna 114. Using the C-V2X TX/RX monitor 120, the scheduler 118 may be made aware of history of all received and transmitted BSMs and also may be aware of their time slots (e.g., of 1 ms) and their subchannels over C-V2X. As discussed in detail below, the TCU 106 may compile time slot information 124 that indicates which future time slots are predicted to include C-V2X messages. This time slot information 124 may be used by the scheduler 118 to schedule 5G NR messages based on the expected or predicted C-V2X messages.

Figure 2:
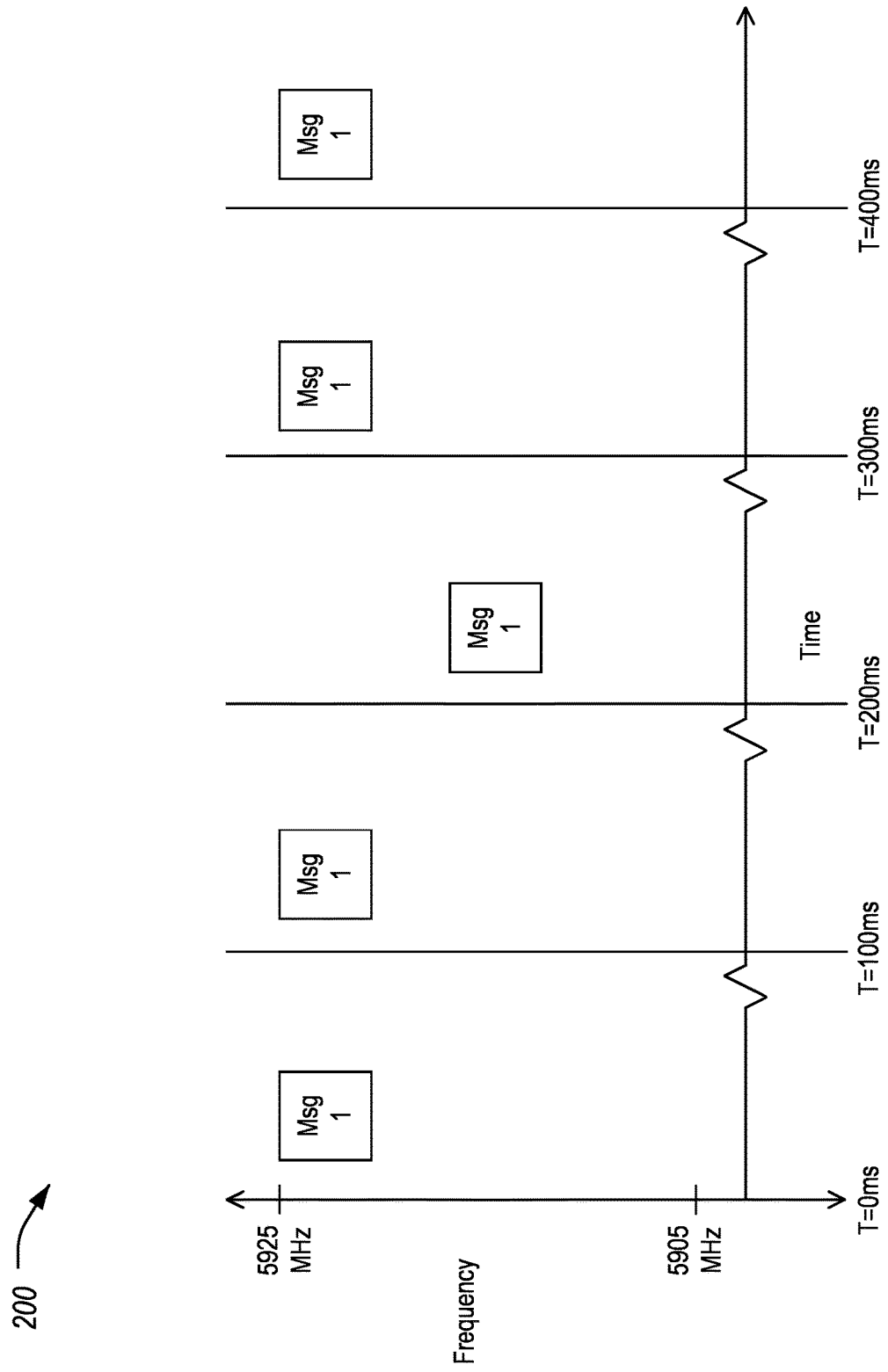
FIG. 2 illustrates an example graph of reception of C-V2X messages.

FIG. 2 illustrates an example graph 200 of reception of C-V2X messages. The example graph 200 is shown for channel 183, which transmits over the 5905-5925 MHz frequency band. This 20-MHz channel may be is split bandwidth-wise into ten subchannels, where a typical C-V2X message utilizes two of those subchannels over the 1 ms interval. The Y-axis represents subchannels, while the X-axis indicates a time scale of C-V2X time slots.

In the example graph 200, the C-V2X antenna 110 of the vehicle 102 is receiving messages (labelled '1'), each spanning 1 ms, sent by another vehicle in a pattern that repeats in the same subchannels every 100 ms for the next few cycles. This repetitive message pattern is referred to as semipersistent scheduling, as the schedule of receptions is predefined from a particular remote vehicle for the next few cycles in advance. Further aspects of the operation of the semipersistent schedule is defined in detail in the 3GPP standard release 14/15.

The vehicle 102 may also receive messages from the other vehicle outside of the semipersistent schedule. For instance, the remote vehicle may also randomize its time slot and subchannel for sending a message. These messages may be referred to as one-shot messages. In the graph 200, one such one-shot message is shown as being received in the 200-300 ms interval. This mix of predefined scheduling and the occasional random transmission is defined in Society of Automotive Engineer (SAE) J3161/1 standard for C-V2X messaging.

Figure 3:
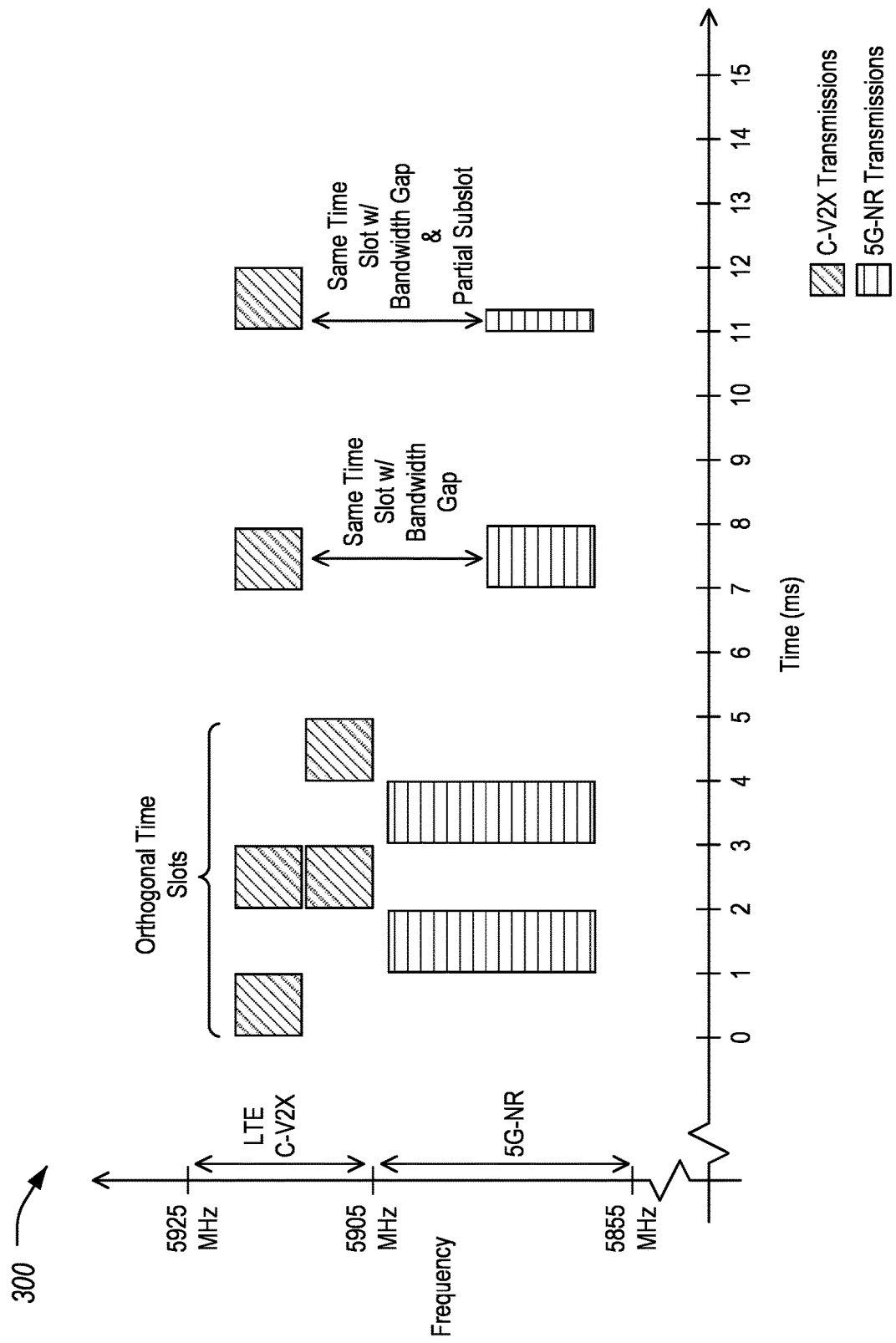
FIG. 3 illustrates an example graph of various new radio vehicle-to-everything (NR-V2X) transmission co-ordination scenarios with C-V2X reception.

FIG. 3 illustrates an example graph 300 of various NR-V2X transmission co-ordination scenarios with C-V2X reception. The Y-axis of the graph 300 indicates the frequency of the communications (in MHz), while the X-axis indicates time in ms increments. It can be seen that 5G NR communications occupy the 5855-5906 MHz frequency band, while C-V2X communications over channel 183 occupy the adjacent 5905-5925 MHz frequency band. The C-V2X messages are shown in the graph 300 as boxes having a diagonal line pattern, and the 5G NR messages are shown as boxes having a horizontal line pattern. Although 5G NR transmissions are sent on a different channel, given the physical proximity of the C-V2X antenna 110 and the NR-V2X antenna 114 of the vehicle 102 and the proximity in frequency, there may still be substantial out-of-band emission (OOBE) interference to C-V2X due to use of NR-V2X. For instance, when a C-V2X message is received in the same time slot as when a 5G NR transmission is being attempted by the vehicle 102, the C-V2X message may encounter interference.

The scheduler 118 may be configured to anticipate the subchannels and time spots of future messages that are sent according to the semipersistent scheduling of C-V2X messages. For instance, the C-V2X TX/RX monitor 120 may monitor the C-V2X antenna 110. In one example, the scheduler 118 may sample the radio channels for key performance metrics every vSampleInterval (e.g., 100 ms).

This monitoring may allow the scheduler 118 to identify a resource reservation field in the first message defining the semipersistent scheduling of future messages. The one-shot messages are ad-hoc and therefore may not be predictable by the scheduler 118. Yet, one-shot receptions are few in quantity relative to scheduled transmissions via the semipersistent message policy.

As the future schedule of received C-V2X messages may be at least partially anticipated from the resource reservation field, a pool of available future time slots that are free may be identified by the scheduler 118 as time slot information 124. This time slot information 124 may be used by the scheduler 118 to exclude those time slots where the scheduler 118 expects to receive periodic C-V2X messages. Foe example, the scheduler 118 may to prevent the vehicle 102 from transmitting 5G NR data when the vehicle 102 is expecting to receive a C-V2X message. The scheduler 118 may accordingly schedule transmissions for the 5G NR radio in the lower ITS band (5855-5905 MHz) based on the monitoring and using various approaches.

In a first example (i), the scheduler 118 may avoid those time slots when C-V2X message receptions are scheduled to occur with semi-persistence. This is shown in the graph 300 as the orthogonal time slots for C-V2X messages as compared to 5G-NR messages. The scheduler 118 may track the time slots where a scheduled reception is likely to occur, although some may still be missed due to one-shot transmissions. Based on that tracking, the scheduler 118 may use the complementary set of time slots where no scheduled receptions are expected over C-V2X for transmission via the 5G NR channels.

In a second example (ii), the scheduler 118 may track those time slots in the time slot information 124 where the received signal strength (RSS) of the C-V2X subchannels exceeds a threshold value and repeats every 100 ms, despite no messages being detected during those times of signal strength. Such a situation implies that interference is likely jamming some C-V2X messages from being received. Logically, since C-V2X reception is affected during those time slots, 5G NR transmission may also suffer interference during those times. Thus, those time slots should also be avoided for 5G NR transmission.

In a third example (iii), if the complementary set of open frequencies in (i) and (ii) is null (i.e., at least one C-V2X message is sent in every time slot in the previous 100 ms), then the scheduler 118 may be configured maximize the bandwidth separation in the next 100 ms between the C-V2X messages and the 5G NR transmissions from the vehicle 102. This is shown in the graph 300 as the same time slots for C-V2X and 5G-NR messages with a bandwidth gap. For instance, the scheduler 118 may choose for 5G NR transmission those time slots indicated in the time slot information 124 where the semipersistent C-V2X message subchannel are closer to 5925 MHz and sets the 5G NR transmissions closer to the lowest edge of its 5855 MHz band.

In a fourth example (iv), as an enhancement to the third example (iii) the scheduler 118 may utilize a shorter time slot (i.e., 0.5 ms or 0.2 ms) for 5G NR transmission so as to further reduce OOBE interference to the received semipersistent C-V2X messages. This is shown in the graph 300 as the same time slots for C-V2X and 5G-NR messages with a bandwidth gap and partial subslot. According to 5G NR release 16, time slots can be 0.5 ms or 0.2 ms but those of the overlapping C-V2X messages will generally always be 1 ms. Reducing 5G NR transmission time may also reduce the interference to C-V2X given that the 5G NR transmit power remains unchanged.

In a fifth example (v), the scheduler 118 may use a predefined transmit power for 5G NR packets to estimate the corresponding RSS on the C-V2X receiver side. For instance, the scheduler 118 may perform a self-test for one or more time slots of the interference between transmissions on the NR-V2X antenna 114 to receptions via the C-V2X antenna 110. Using the results of these tests, the scheduler 118 may estimate isolation loss in decibels between the C-V2X antenna 110 and the NR-V2X antenna 114. For example, if 5G NR transmissions are at 20 dB and the RSS in C-V2X in all subchannels are below noise level (e.g., −100 dBm) then the isolation loss is sufficiently large (i.e., 120 dB). In this case, the scheduler 118 may allow 5G NR transmissions in any time slot since the C-V2X receptions may be minimally affected. Note that the dual antenna system as shown in FIG. 1 assumes separate antennas for C-V2X and 5G NR. In other examples, a single antenna may be used for both C-V2X and 5G NR.

Thus, in examples (i) and (ii), the scheduler 118 avoids 5G NR transmission in those C-V2X time slots where messages are scheduled as being received in a semipersistent pattern. In examples (iii) and (iv), however, if a 5G NR packet is to be sent, then it may be sent such that the received semipersistent messages and 5G NR packet transmissions are widely separated in frequency. In examples (v), the scheduler 118 may learn about the isolation between the 5G NR antenna to the C-V2X antenna over the course of time. Since these isolation levels do not usually change, the scheduler 118 may use this information to determine whether it is prudent to permit 5G NR transmissions.

These techniques may be useful for multiple antenna systems 100. However, in a single antenna system 100 where one antenna is used for both 5G NR and C-V2X, there may be additional considerations. In such a system 100, the scheduler 118 may duplex between operating only C-V2X or operating only 5G NR but not both in any given time slot. In many examples this may cause the scheduler 118 to prioritize receiving C-V2X messages over sending 5G NR packets. This may mean that the receipt of semipersistent C-V2X messages may limit the temporal opportunities for sending 5G NR messages.

The scheduler 118 may estimate the CBR in channel 183 to how much of it is used for C-V2X operation. For example, a CBR of 0.8 implies that 80% of the bandwidth resources are being consumed in the past 100 ms. If the CBR is below a threshold, then the scheduler 118 may use a small fraction of subsequent 100 ms for 5G NR operation, whereas if the CBR is above a higher level, then the schedulers 118 may cease any 5G NR operation.

Figure 4:
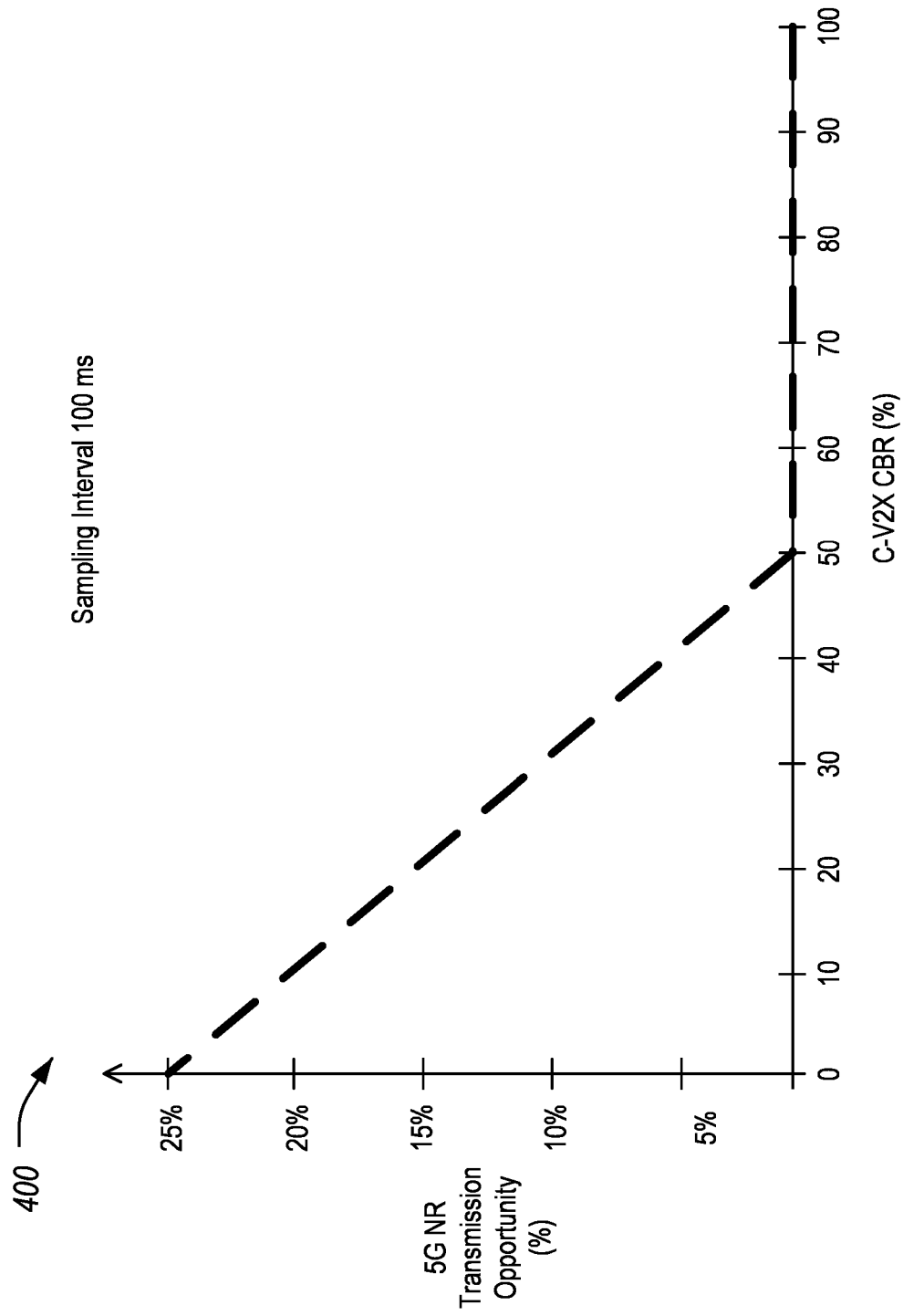
FIG. 4 illustrates an example graph of the relationship of transmission opportunity time for 5G NR according to C-V2X channel busy ratio (CBR)

FIG. 4 illustrates an example graph 400 of a logical relationship of transmission opportunity time for 5G NR according to C-V2X CBR. As can be seen, in the single antenna system, the opportunity time for 5G NR declines as C-V2X CBR increases. In this example single-antenna system 100 cycling between C-V2X and 5G NR, the 5G NR messaging will not be assigned the opportunity to operate more than 25% of the time. However, this level may be incrementally reduced to zero as CBR of C-V2X rises.

More formally, the following logic may be used:

---

If CBR < $Threshold_1$:
    TransmitOpportunityTime$_{5GNR}$ = TxOppThreshold$_1$,
Where:
    TxOppThreshold$_1$ is a percentage of time (e.g., 25%) set every vSampleInterval;
Else if CBR > $Threshold_2$:

-continued

```
    TransmitOpportunityTime_{5GNR} = 0,
Else:
    TransmitOpportunityTime_{5GNR} = a linear function between
    TxOppThreshold_1 and 0 based on CBR.
```

Figure 5:
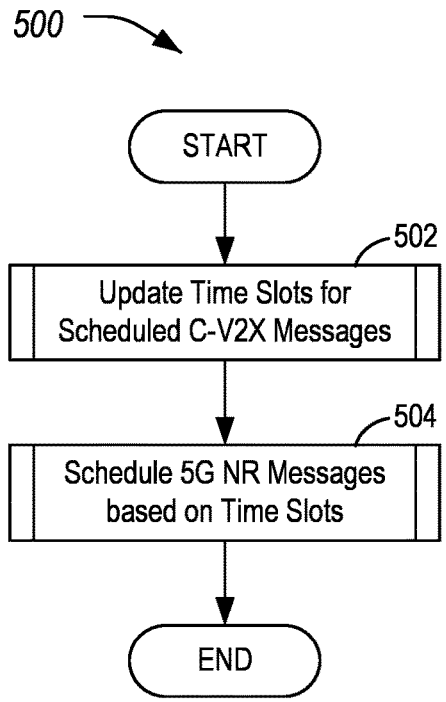
FIG. 5 illustrates an example process for the operation of the system for scheduling vehicle communications using a plurality of wireless interfaces.

FIG. 5 illustrates an example process 500 for the operation of the system 100 for scheduling vehicle communications using a plurality of wireless interfaces. In an example, the process 500 may be performed by the TCU 106 using the services of the scheduler 118 to determine how to transmit 5G NR messages using the NR-V2X antenna 114 based on the messages received by the C-V2X antenna 110.

At operation 502, the TCU 106 updates time slot information 124 for scheduled C-V2X messages. Aspects of operation 502 are discussed in detail with respect to process 600 of FIG. 6. At operation 504, the TCU 106 schedules 5G NR messages based on the time slot information 124. Aspects of operation 504 are discussed in detail with respect to process 700 of FIG. 7. After operation 504, the process 500 ends. It should be noted, that the process 500 may be continuous and may be executed in a loop wise manner. Moreover aspects of the operations 502 and 504 may be executed concurrently with one other.

Figure 6:
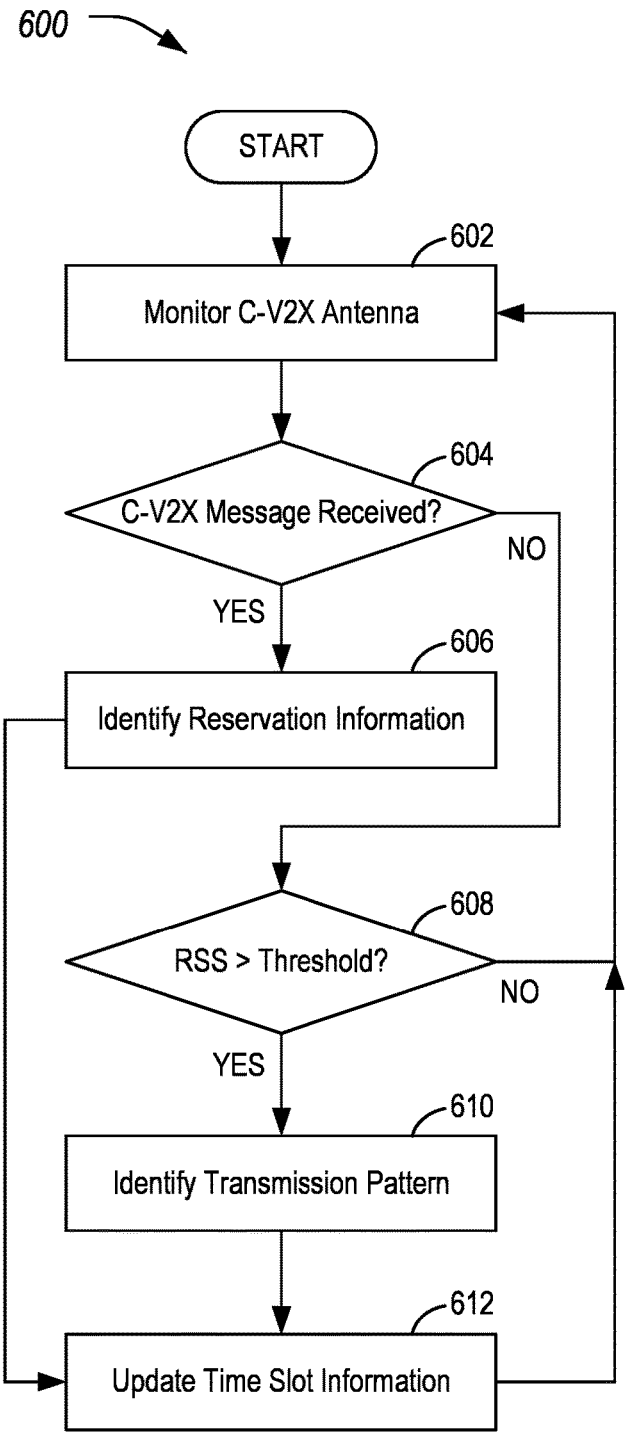
FIG. 6 illustrates an example process for updating time slot information for scheduled C-V2X messages.

FIG. 6 illustrates an example process 600 for updating time slot information 124 for scheduled C-V2X messages. In the execution of operation 502 of the process 500, aspects of the process 600 may be performed by the TCU 106 using the services of the scheduler 118.

At operation 602, the TCU 106 monitors the C-V2X antenna 110. In an example, the TCU 106 may utilize the C-V2X TX/RX monitor 120 to analyze the signals that are received to the C-V2X antenna 110. For instance, the scheduler 118 may sample the radio channels every vSampleInterval (e.g., 100 ms).

At operation 604, the TCU 106 determines whether a C-V2X message was received. For instance, based on the signal information for the C-V2X antenna 110 that is monitored by the C-V2X TX/RX monitor 120, the TCU 106 may identity whether a valid C-V2X message was picked up by the C-V2X antenna 110. If so, control passes to operation 606 to process the received C-V2X message.

At operation 606, the TCU 106 identifies reservation information from the received C-V2X message. In an example, the C-V2X message may include a resource reservation interval (RRI), which may be identified by the TCU 106. This may be used to estimate interval transit time (ITT) between the received message and future usage of the same frequencies. For instance, the scheduler 118 may utilize a sliding window that is a multiple of ITT to determine the time slots during which the C-V2X antenna 110 is predicted to be busy. In one example, the scheduler 118 may estimate the next 8-10 time slots. After operation 606, control passes to operation 612 to update the time slot information 124.

At operation 608, proceeding from operation 604, the TCU 106 determines whether the RSS received at the C-V2X antenna 110 exceeds a predefined threshold. This may be done even if a C-V2X message was not validly received. In an example the TCU 106 may utilize the C-V2X TX/RX monitor 120 to receive signal strength information corresponding to the signal received to the c-V2X antenna 110. The predefined threshold may a threshold signal strength level such that if the transmission is of at least the predefined threshold level, then the scheduler 118 may infer that the signal is sufficient to provide interference to any 5G NR messages sent by the NR-V2X antenna 114, regardless of whether a C-V2X message was successfully identified or decoded. In some examples, the predefined threshold value may be provided to the vehicle 102, while in others it may be trained by the vehicle 102 as a threshold value above which errors are encountered for 5G NR messages sent by the vehicle 102. If signal strength exceeds the predefined threshold, control passes to operation 610. If not, control returns to operation 602 to again monitor the C-V2X antenna 110.

At operation 610, the TCU 106 identifies a transmission pattern. In an example, if the signal at operation 608 is detected at the same frequencies for multiple consecutive time periods (e.g., every 100 ms), then the scheduler 118 may infer that these transmissions form a pattern of times where there may be interference to 5G NR messages. If no such pattern is detected, then a current transmission may be marked in the time slot information 124 without a prediction. Likewise, if a previously determined transmission pattern ceases, then those estimated pattern of future signal receptions may be discontinued. After operation 610, control passes to operation 612.

At operation 612, the TCU 106 updates the time slot information 124. In an example, based on the reservation information determined at operation 606, and/or the transmission pattern information determined at operation 610, the scheduler 118 may update the time slot information 124 to indicate expected future transmissions. This time slot information 124 may indicate timing and frequencies used by the expected transmissions. The time slot information 124 may be estimated for a sliding window that is a multiple of ITT for determining the time slots during which the C-V2X antenna 110 is scheduled to be busy (e.g., 8 time slots, 10 time slots, etc.). After operation 612, control returns to operation 602 to continue monitoring the C-V2X antenna 110.

Figure 7:
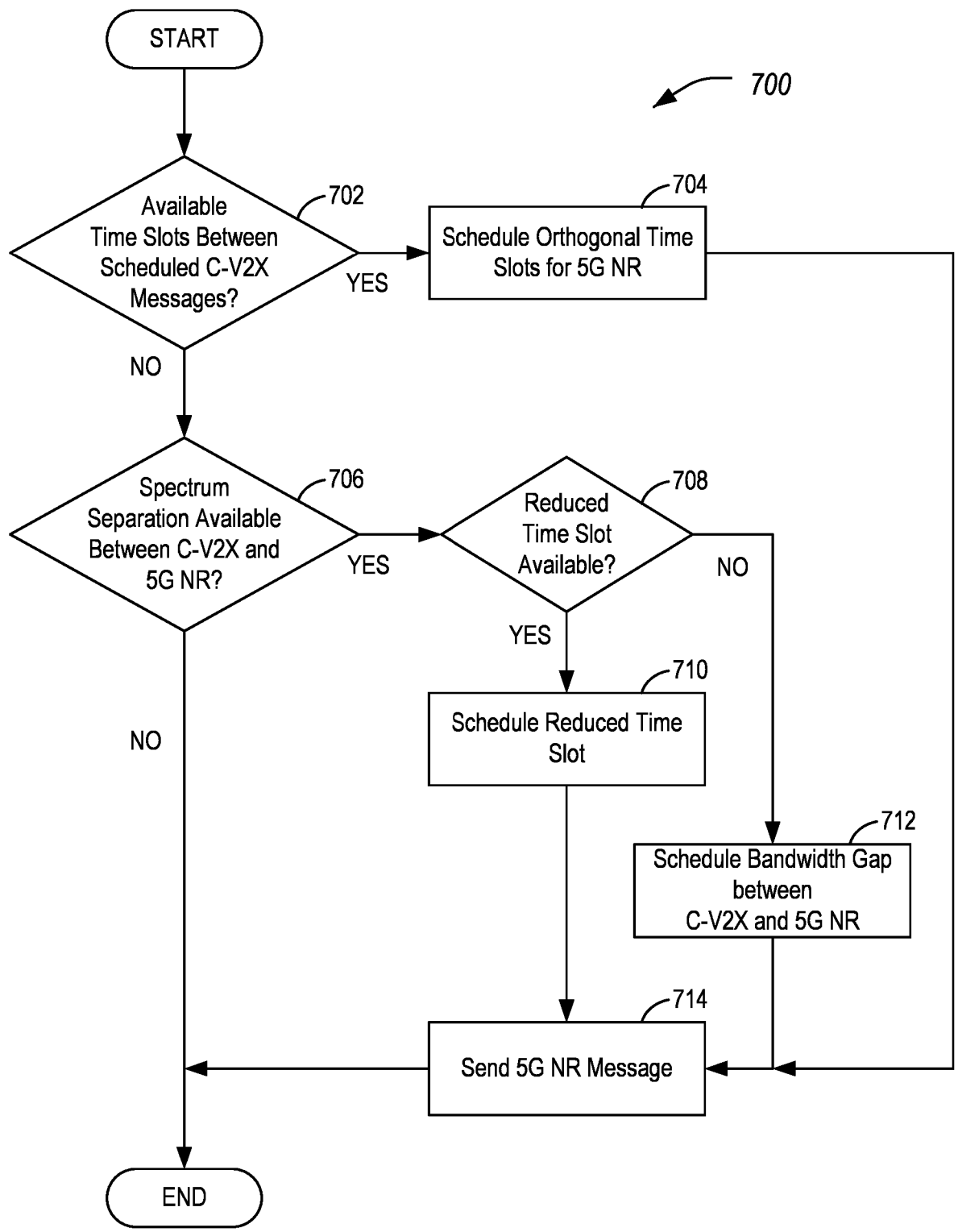
FIG. 7 illustrates an example process for scheduling, based on the time slot information, 5G NR messages that are requested to be sent.

FIG. 7 illustrates an example process 700 for scheduling, based on the time slot information 124, 5G NR messages that are requested to be sent. In the execution of operation 504 of the process 500, aspects of the process 700 may also be performed by the TCU 106 using the services of the scheduler 118. It should be noted that the process 700 illustrates various strategies of performing the scheduling of the 5G NR messages, and variations of the process 700 may use a subset of or a different ordering of the illustrated strategies.

At operation 702, the TCU 106 determines, based on the time slot information 124 updated via the process 600, whether there are available time slots between expected C-V2X messages. For example, the TCU 106 may utilize the scheduler 118 to identify whether there is sufficient availability in bandwidth resources expected to remain unconsumed by C-V2X communications to send the requested 5G NR messages. If so, control passes to operation 704. If not, control passes to operation 706.

At operation 704, the TCU 106 utilizes the scheduler 118 to schedule the sending of 5G NR messages utilizing orthogonal time slots to the time slots in which C-V2X messages are scheduled. An example of this strategy is shown at 0-5 ms in the graph 300 of FIG. 3. After operation 704, control passes to operation 714 to send the 5G NR message at the scheduled time.

At operation 706, the TCU 106 determines, based on the time slot information 124, whether there is spectrum separation available between C-V2X. In an example, while orthogonal use of time slots may not be available, the TCU 106 may utilize the scheduler 118 to identify where there is at least a predefined separation between the frequencies being used for C-V2X and that available for use for 5G NR to allow for concurrent use of C-V2X and 5G NR. If so, control passes to operation 708. If not, then the 5G NR message is unable to be sent given the time slot information 124 and the process 700 ends. In some examples, the process 700 may be restarted at a later time index in a renewed attempt to send the 5G NR message.

At operation 708, the TCU 106 determines whether a reduced time slot is available for sending the 5G NR message. For instance, the TCU 106 may utilize the scheduler 118 to determine whether the size of the information for sending via 5G NR is small enough to utilize a shorter time slot (i.e., 0.5 ms or 0.2 ms) for 5G NR transmission so as to further reduce OOBE interference to the received semipersistent C-V2X messages. If so, control passes to operation 710. If not, control passes to operation 712.

At operation 710, the TCU 106 schedules the 5G NR message in a reduced time slot. An example of this strategy is shown at 11-12 ms in the graph 300 of FIG. 3. After operation 710, control passes to operation 714 to send the 5G NR message at the scheduled time.

At operation 712, the TCU 106 schedules the 5G NR message in a full time slot. An example of this strategy is shown at 7-8 ms in the graph 300 of FIG. 3. After operation 712, control passes to operation 714 to send the 5G NR message at the scheduled time.

At operation 714, the TCU 106 sends the 5G NR message as scheduled. This may include providing the message via the NR-V2X signal path and antenna interface 116 to the NR-V2X antenna 114, as well as utilizing the C-V2X TX/RX monitor 120 to monitor interference received to the C-V2X antenna 110, and utilizing the NR-V2X TX/RX monitor 122 to monitor whether the transmission of the 5G NR message was or was not successful. If the send was successful, the process 700 ends. If not, then the process 700 may be restarted at a later time index in a renewed attempt to send the 5G NR message.

Figure 8:
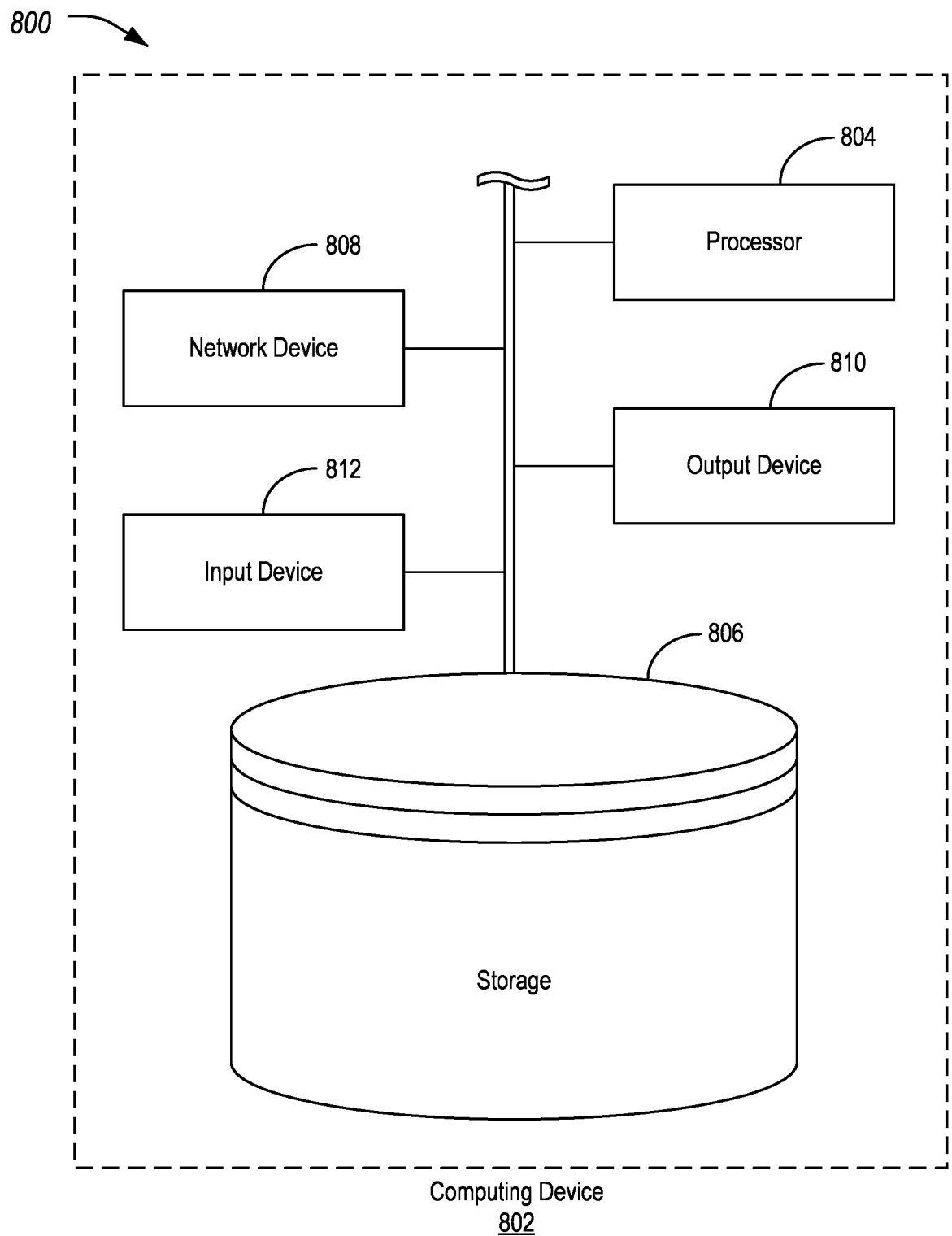
FIG. 8 illustrates an example computing device for tracking a non-reputable vehicle change history.

FIG. 8 illustrates an example computing device 802 for scheduling vehicle communications using a plurality of wireless interfaces. Referring to FIG. 8, and with reference to FIGS. 1-7, the ECUs 104 and TCU 106 may include examples of such computing devices 802. Computing devices 802 generally include computer-executable instructions, such as those of the scheduler 118, where the instructions may be executable by one or more computing devices 802. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the time slot information 124, may be stored and transmitted using a variety of computer-readable media.

As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raiseable device that may, in an example, be configured to display braille or another physical output that may be touched to provide information to a user.

The input device 812 may include any of various devices that enable the computing device 802 to receive control input from users. Examples of suitable input devices 812 that receive human interface inputs may include keyboards, mice, trackballs, touchscreens, microphones, graphics tablets, and the like.

The network devices 808 may each include any of various devices that enable the described components to send and/or receive data from external devices over networks. Examples of suitable network devices 808 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for scheduling communications using a plurality of wireless interfaces, comprising:
    a first antenna configured to send and/or receive first messages over a first message protocol;
    a second antenna configured to send and/or receive second messages over a second message protocol, wherein the first antenna and the second antenna operate on different channels; and
    a controller configured to utilize a scheduler to perform operations including to
        monitor signals received from the first antenna,
        using the signals, update time slot information indicative of which equally-sized consecutive future time slots the first antenna is predicted to transmit and/or receive the first messages, and
        schedule a transmission of a second message using the second antenna over the second message protocol, using the time slot information to avoid out-of-band emission (OOBE) interference.

2. The system of claim 1, wherein the time slot information indicates which of the time slots the first antenna is predicted to transmit and/or receive the first messages over a sliding window of future transmission intervals that is a multiple of interval transit time (ITT) for the first message protocol.

3. The system of claim 2, wherein the multiple is on the order of ten consecutive time slots.

4. The system of claim 1, wherein the controller is configured to:
    identify, based on the time slot information, that a free time slot is available to send the second message, the free time slot being orthogonal to the time slots in the time slot information that indicate use of the first antenna; and
    schedule the transmission of the second message during the free time slot.

5. The system of claim 1, wherein the controller is configured to:
    identify, based on the time slot information, that a bandwidth-separated time slot is available to send the second message, the bandwidth-separated time slot being concurrent with time slots in the time slot information that indicate use of the first antenna; and
    schedule the transmission of the second message during the bandwidth-separated time slot.

6. The system of claim 5, wherein the controller is configured to utilize a partial time slot for transmission of the second message to further reduce the OOBE interference to the first messages.

7. The system of claim 6, wherein the partial time slot is one half of the duration of the time slots for receiving the first messages.

8. The system of claim 6, wherein the partial time slot is one fifth of the duration of the time slots for receiving the first messages.

9. The system of claim 1, wherein the controller is further configured to:
    responsive to the controller identifying a first message is received for a time slot, utilize reservation information included in the first message to predict the timing of additional first messages; and
    update the time slot information to indicate that the first antenna is predicted to be busy during the additional first messages.

10. The system of claim 1, wherein the controller is further configured to:
    responsive to the controller identifying a pattern of signal strength above a predefined threshold strength is received for a plurality of time slots, update the time slot information to indicate that the first antenna is predicted to be busy during additional time slots continuing the pattern.

11. The system of claim 1, wherein the first antenna and the second antenna are integrated with one another, and the controller is further configured to:
    determine a channel busy ratio for the first antenna; and
    set a transmission opportunity percentage for the second antenna as a linear decreasing function of the channel busy ratio.

12. The system of claim 1, wherein the first message protocol is cellular vehicle-to-everything (C-V2X), and the second message protocol is 5G new radio (NR).

13. A method for scheduling communications using a plurality of wireless interfaces, comprising:

monitoring signals received from a first antenna configured to send and/or receive first messages over a first message protocol;
using the signals, updating time slot information indicative of which equally-sized consecutive future time slots the first antenna is predicted to transmit and/or receive the first messages; and
scheduling a transmission of a second message over a second antenna configured to send and/or receive second messages over a second message protocol using the time slot information to avoid out-of-band emission (OOBE) interference.

14. The method of claim 13, wherein the time slot information indicates which of the time slots the first antenna is predicted to transmit and/or receive the first messages over a sliding window of future transmission intervals that is a multiple of interval transit time (ITT) for the first message protocol.

15. The method of claim 13, further comprising:
identifying, based on the time slot information, that a free time slot is available to send the second message, the free time slot being orthogonal to the time slots in the time slot information that indicate use of the first antenna; and
scheduling the transmission of the second message during the free time slot.

16. The method of claim 13, further comprising:
identifying, based on the time slot information, that a bandwidth-separated time slot is available to send the second message, the bandwidth-separated time slot being concurrent with time slots in the time slot information that indicate use of the first antenna; and
scheduling the transmission of the second message during the bandwidth-separated time slot.

17. The method of claim 16, further comprising utilizing a partial time slot for transmission of the second message to further reduce the OOBE interference to the first messages.

18. The method of claim 13, further comprising:
responsive to identifying a first message is received for a time slot, utilizing reservation information included in the first message to predict the timing of additional first messages; and
update the time slot information to indicate that the first antenna is predicted to be busy during the additional first messages.

19. The method of claim 13, further comprising:
responsive to identifying a pattern of signal strength above a predefined threshold strength is received for a plurality of time slots, updating the time slot information to indicate that the first antenna is predicted to be busy during additional time slots continuing the pattern.

20. The method of claim 13, wherein the first antenna and the second antenna are integrated with one another, and further comprising:
determining a channel busy ratio for the first antenna; and
setting a transmission opportunity percentage for the second antenna as a linear decreasing function of the channel busy ratio.

21. The method of claim 13, wherein the first message protocol is cellular vehicle-to-everything (C-V2X), and the second message protocol is 5G new radio (NR).

22. A non-transitory computer-readable medium comprising instructions for scheduling communications using a plurality of wireless interfaces that, when executed by a controller, cause the controller to perform operations including to:
monitor signals received from a first antenna configured to send and/or receive first messages over a first message protocol;
using the signals, update time slot information indicative of which equally-sized consecutive future time slots the first antenna is predicted to transmit and/or receive the first messages, wherein the time slot information indicates which of the time slots the first antenna is predicted to transmit and/or receive the first messages over a sliding window of future transmission intervals that is a multiple of interval transit time (ITT) for the first message protocol; and
schedule a transmission of a second message over a second antenna configured to send and/or receive second messages over a second message protocol using the time slot information to avoid out-of-band emission (OOBE) interference.

23. The medium of claim 22, further comprising instructions that, when executed by the controller, cause the controller to perform operations including to:
identify, based on the time slot information, that a free time slot is available to send the second message, the free time slot being orthogonal to the time slots in the time slot information that indicate use of the first antenna; and
schedule the transmission of the second message during the free time slot.

24. The medium of claim 22, further comprising instructions that, when executed by the controller, cause the controller to perform operations including to:
identify, based on the time slot information, that a bandwidth-separated time slot is available to send the second message, the bandwidth-separated time slot being concurrent with time slots in the time slot information that indicate use of the first antenna; and
schedule the transmission of the second message during the bandwidth-separated time slot.

25. The medium of claim 24, further comprising instructions that, when executed by the controller, cause the controller to perform operations including to utilize a partial time slot for transmission of the second message to further reduce the OOBE interference to the first messages.

26. The medium of claim 22, further comprising instructions that, when executed by the controller, cause the controller to perform operations including one or more of to:
responsive to identifying a first message is received for a time slot, utilize reservation information included in the first message to predict the timing of additional first messages and update the time slot information to indicate that the first antenna is predicted to be busy during the additional first messages; or
responsive to identifying a pattern of signal strength above a predefined threshold strength is received for a plurality of time slots, update the time slot information to indicate that the first antenna is predicted to be busy during additional time slots continuing the pattern.

* * * * *